(12) United States Patent
Johnson et al.

(10) Patent No.: US 12,387,166 B2
(45) Date of Patent: Aug. 12, 2025

(54) DELIVERY MONITORING, TRACKING AND GUIDANCE SYSTEMS AND METHODS

(71) Applicants: DENSO International America, Inc., Southfield, MI (US); DENSO CORPORATION, Kariya (JP)

(72) Inventors: Matthew Johnson, Royal Oak, MI (US); Martín Nespolo, Grosse Pointe Woods, MI (US); Sibu Varughese, Sterling Heights, MI (US); Wilson Yim, Ann Arbor, MI (US); Thomas Krzyzak, Livonia, MI (US); Ginelle Reed, Novi, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 17/987,010

(22) Filed: Nov. 15, 2022

(65) Prior Publication Data

US 2023/0222434 A1 Jul. 13, 2023

Related U.S. Application Data

(60) Provisional application No. 63/266,743, filed on Jan. 13, 2022.

(51) Int. Cl.
*G06Q 10/0833* (2023.01)
*G06Q 10/083* (2024.01)
*G06Q 10/0832* (2023.01)

(52) U.S. Cl.
CPC ..... *G06Q 10/0833* (2013.01); *G06Q 10/0832* (2013.01); *G06Q 10/0838* (2013.01)

(58) Field of Classification Search
CPC .......... G06Q 10/0833; G06Q 10/0832; G06Q 10/0838

(Continued)

(56) References Cited

U.S. PATENT DOCUMENTS 6,496,775 B2   12/2002   McDonald, Jr. et al.
9,208,626 B2   12/2015   Davidson
(Continued)

OTHER PUBLICATIONS

"Package Delivery System Based on Blockchain Infrastructure" Published by IEEE (Year: 2018).*

*Primary Examiner* — Zeina Elchanti
(74) *Attorney, Agent, or Firm* — Harness, Dickey & Pierce, P.L.C.

(57) ABSTRACT

A delivery compliance system includes a memory and a control module. The memory stores a driver compliance application. The control module executes the driver compliance application to: detect states of vehicle devices; detect location and speed information indicative of a location and speed of at least one of a delivery vehicle, a mobile device, and an augmented reality (AR) device; determine a delivery route for delivery of a first package from a start location to a drop off location; based on the location and speed information and the delivery route, determine compliance correct states; compare the states to the compliance correct states; and based on the comparison, generate instructions to instruct a driver of the delivery vehicle to become in compliance for the delivery of the first package and/or be in compliance when making a subsequent delivery of a second package.

25 Claims, 9 Drawing Sheets

(58) Field of Classification Search
USPC .......................................................... 705/333
See application file for complete search history.

(56) References Cited

U.S. PATENT DOCUMENTS

| | | | |
|---|---|---|---|
| 10,817,826 | B2 | 10/2020 | Klingenberg et al. |
| RE48,294 | E | 11/2020 | Zwillinger et al. |
| 11,887,041 | B2 * | 1/2024 | Subramanian ....... G06Q 10/083 |
| 2009/0009321 | A1 * | 1/2009 | McClellan ............. G08G 1/207 |
| | | | 340/539.13 |
| 2019/0347612 | A1 | 11/2019 | Anders et al. |
| 2020/0160264 | A1 * | 5/2020 | Silverman ........ G06Q 10/06315 |
| 2021/0182787 | A1 * | 6/2021 | Mouli ................ G06Q 10/0838 |
| 2022/0129841 | A1 * | 4/2022 | Gutke ............. G08B 13/19602 |
| 2022/0203996 | A1 * | 6/2022 | Katz ..................... B60W 50/14 |

* cited by examiner

DELIVERY MONITORING, TRACKING AND GUIDANCE SYSTEMS AND METHODS

CROSS-REFERENCE TO RELATED APPLICATIONS

This application claims the benefit of U.S. Provisional Application No. 63/266,743, filed on Jan. 13, 2022. The entire disclosure of the above application is incorporated herein by reference.

FIELD

The present disclosure relates to delivery systems.

BACKGROUND

This section provides background information related to the present disclosure which is not necessarily prior art.

Package delivery typically includes a carrier (or delivery service provider) receiving a package from a consignor and/or picking up the package at the consignor and then delivering the package to a consignee. This may be done by the consignor delivering the package to the carrier or by the consignor making arrangements with the carrier to pick up the package at the consignor. The carrier then arranges delivery of the package to the consignee. The carrier may deliver thousands of packages a year via hundreds of delivery vehicles.

SUMMARY

This section provides a general summary of the disclosure, and is not a comprehensive disclosure of its full scope or all of its features.

A delivery compliance system is disclosed and includes a memory and a control module. The memory is configured to store a driver compliance application. The control module is configured to execute the driver compliance application to: detect states of vehicle devices; detect location and speed information indicative of a location and speed of at least one of a delivery vehicle, a mobile device, and an augmented reality (AR) device; determine a delivery route for delivery of a first package from a start location to a drop off location; based on the location and speed information and the delivery route, determine compliance correct states; compare the states to the compliance correct states; and based on the comparison, generate instructions to instruct a driver of the delivery vehicle to at least one of i) become in compliance for the delivery of the first package, and ii) be in compliance when making a subsequent delivery of a second package.

In other features, the vehicle devices comprise two or more of a hazard light, an engine, a door lock, a window motor, an ignition key, and a seat belt buckle. In other features, the control module is configured to determine whether a pattern of states of the vehicle devices at least one of matches and is in compliance with a compliance pattern, and generate the instructions based on differences between the pattern of states and the compliance pattern.

In other features, the control module is configured to determine whether a pattern of states of the vehicle devices over time and along the determined route at least one of match and are in compliance with a compliance pattern, and generate the instructions based on differences between the pattern of states and the compliance pattern.

In other features, the control module is configured to provide live coaching for the driver to become in compliance for the delivery of the first package. In other features, the control module is configured to provide instructions for the driver to be in compliance for delivery of a second package delivered subsequent to delivery of the first package.

In other features, the control module is configured to provide the instructions via an infotainment system of the delivery vehicle. In other features, the control module is configured to provide instructions via a display of the mobile device. In other features, the control module is configured to provide instructions via a display of the AR device.

In other features, the control module is implemented in the delivery vehicle. In other features, the control module is implemented in the mobile device. In other features, the control module is implemented in the AR device.

In other features, the delivery compliance system further includes a transceiver configured to transmit the states of the vehicle devices to a cloud-based server, and receive at least some of the instructions from the cloud-based server. In other features, the control module is configured to determine the route based on at least one of historical routes of the delivery vehicle and historical routes of other delivery vehicles.

In other features, a delivery guidance system is disclosed and includes a memory and a control module. The memory is configured to store a delivery guidance application and historical delivery routes. The control module is configured to: determine package information for a package to be delivered; determine a start location and a drop off location; obtain ones of the historical delivery routes beginning at the start location and ending at least one of the drop off location and a premises of the drop off location; selecting a delivery route based on the ones of the historical delivery routes; and generating step-by-step instructions to guide a delivery person along the selected delivery route to transport the package from the start location to the drop off location including a last 10 feet of the selected delivery route via at least one of an infotainment system of a delivery vehicle, a display of a mobile device, and a display of an augmented reality (AR) device.

In other features, the control module is configured to track behavior of the delivery person based on at least one of states of devices of the delivery vehicle, states of the mobile device, and states of the AR device, to compare the tracked behavior to compliance information, and based on this comparison, generate the step-by-step instructions. In other features, the step-by-step instructions include instructions for the last 10 feet of the selected delivery route of the package.

In other features, the delivery guidance system further includes a transceiver configured to receive a beacon signal from a beacon located at the drop off location. The control module is configured, based on the beacon signal, to generate the step-by-step instructions at least in the last 10 feet of the selected delivery route of the package.

In other features, the control module is implemented in the delivery vehicle. In other features, the control module is implemented in the mobile device. In other features, the control module is implemented in the AR device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

A delivery service provider uses fleet vehicles to delivery packages. The fleet vehicles are driven by drivers, which may each deliver numerous packages a day to corresponding locations. Efficiency of delivery in both time and costs and safety of the drivers and fleet vehicles are important concerns of the delivery service provider. Efficiency of delivery can be affected by the number of tasks performed by the driver at each location and the order of the tasks performed. Fuel efficiency of a delivery is affected by whether an engine of the vehicle is left running while at a package destination site (or customer location) and how long it takes for a driver to find the specific drop off location once the driver is on the property of the customer. For example, a driver may need to determine a specific parking lot, building, office, doorway, unloading dock location, etc., which can take some time.

In a hurry to delivery a package, a driver may leave the engine running and/or may perform or refrain from performing some other task, which may risk the safety of the driver, the fleet vehicle and/or a nearby object. For example, the driver may refrain from buckling his/her seat belt in order to save a few seconds at each delivery. As another example, a driver may refrain from locking vehicle doors and/or closing vehicle windows, which could result in unpermitted taking of packages from the vehicle and/or one or more packages falling out of the vehicle. As another example, a driver may refrain from docking a mobile phone and/or use the mobile phone while driving (e.g., texting, making a phone call, looking up directions, and/or performing some other operation on the mobile phone). This distracts the driver and risks an accident.

Figure 1:
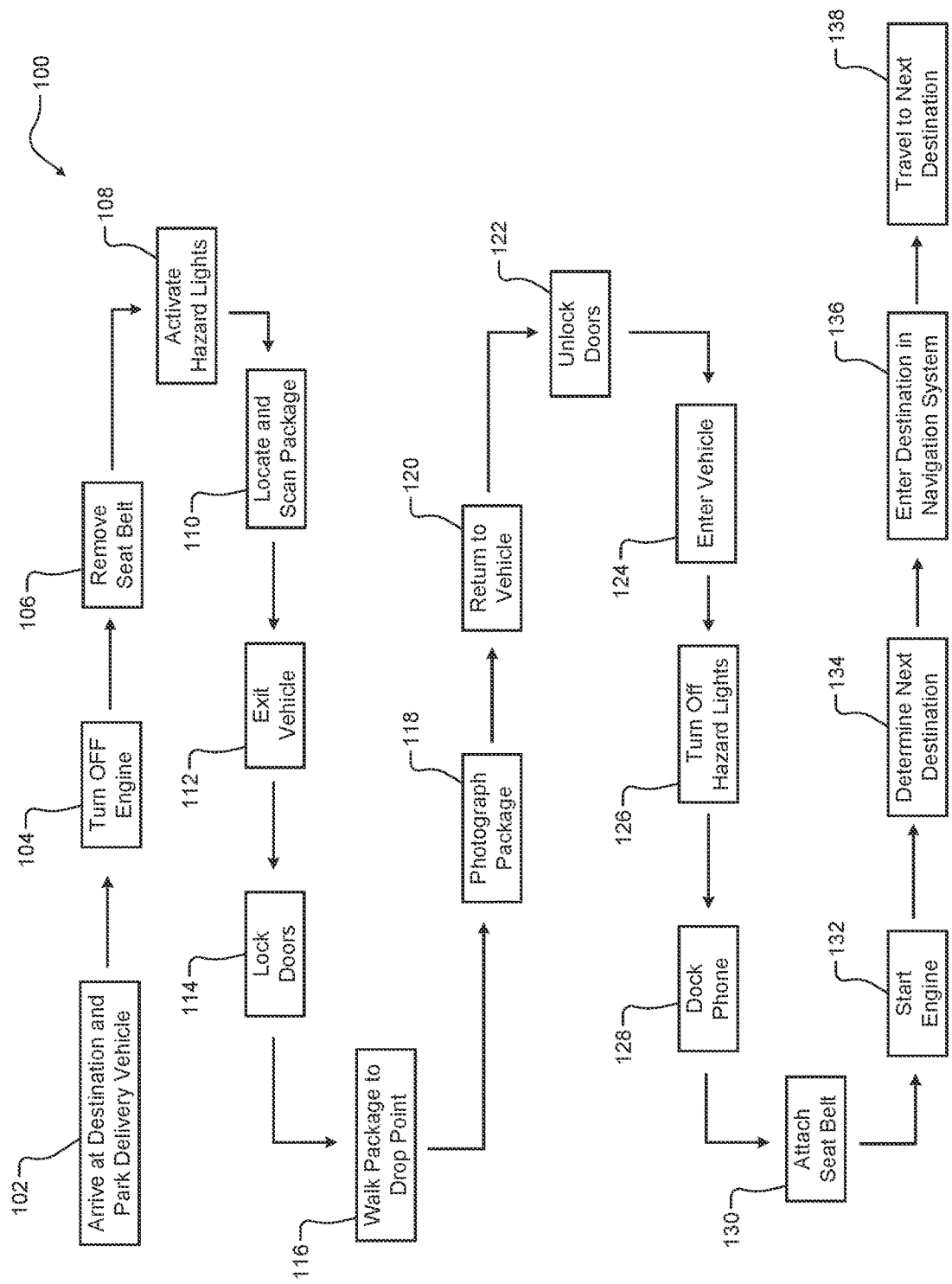
FIG. 1 is a diagram illustrating an example delivery procedure.

Delivery service provides may have delivery procedure for drivers to follow when delivering a package. FIG. 1 shows an example delivery procedure 100 for delivering a first package to a first location and preparation for delivery of a next (or second) package to a second location. The delivery procedure is provided as an example and may include other tasks than shown and/or exclude one or more of the shown tasks. In addition, the tasks may be performed in a different order than shown.

The delivery procedure 100 may include at 102 arriving at a destination and parking a delivery vehicle. At 104, the driver is to turn off the engine of the delivery vehicle. At 106, the driver is to unbuckle and remove his/her seat belt. At 108, the driver is to activate hazard lights of the delivery vehicle to make people nearby aware of the delivery vehicle. At 110, the driver may locate, in the delivery vehicle, the first package and scan the first package via, for example, a mobile device. At 112, the driver may then exit the delivery vehicle with the first package. The driver may be required to close the windows of the delivery vehicle prior to turning off the engine and/or prior to exiting the delivery vehicle.

At 114, the driver is to lock the vehicle. At 116, the driver walks the package to the intended drop point. At 118, the driver is to take a picture of the package at the drop point for future reference to show delivery of the package. At 120, the driver is to return to the delivery vehicle. At 122, the driver unlocks the doors in order to enter the delivery vehicle. At 124, the driver enters the delivery vehicle. At 126, the driver turns off the hazard lights of the delivery vehicle. At 128, the driver is to dock the mobile device (e.g., mobile phone). At 130, the driver is to attach his/her seat belt and wear the seat belt while driving. At 132, the driver is to start the engine of the delivery vehicle. At 134, the driver is to determine a next destination. This may occur automatically without driver input. At 136, the driver is to enter the next destination in a navigation system. At 138, the driver is to travel to the next destination.

Delivery service providers struggle to enforce policies on their dispatched delivery drivers. Most of the non-compliant activities are associated with delivery vehicle usage such as not activating hazard lights, not buckling seat belts, not closing and locking doors and turning engine off at every delivery stop. The "last 10 feet" to deliver a package can be an undesirable portion and/or inefficient portion of a delivery for a delivery driver due to: the driver delivering the package to an unfamiliar territory or location; the driver needing to get through apartment or office complex security; and the driver receiving poor instructions from customers. The last 10 feet, does not necessarily refer to the actual last 10 feet of a delivery route, but rather refers to a last portion of a delivery route, typically when a delivery vehicle has arrived at the premises of a destination and the driver still needs to find: a particular parking lot; a particular building; a particular doorway and/or drop off point of the building; a particular floor; a particular hallway; a particular room; a mailroom, a doorstep, etc. Drivers at certain package delivery companies are under pressure to achieve high and/or perfect delivery rate numbers. This metric is based on timely delivery and post-delivery customer feedback.

The examples set forth herein include a driver (or delivery) compliance systems for monitoring and tracking driver behavior and providing live and/or post guidance to drivers. Statuses of vehicle system devices are monitored as well as other vehicle parameters to determine driver behavior, which is compared to preset delivery procedures and/or patterns of states of devices along routes to detect non-compliance with the preset delivery procedures and/or patterns. Countermeasures are performed to alter driver behavior to be consistent with and thus in compliance with a preset delivery procedure. A telematics module may be used to communicate vehicle status information and driver behavior data to a cloud-based server of a delivery service provider. The telematics module may also be used to relay delivery information to a mobile device of the driver when transferring a package from a delivery vehicle to a specific drop off location.

A fleet manager of the delivery service provider may receive the driver behavior data and provide feedback information, which may be included in a response signal. The delivery service provider may provide the response signal including instructions for the driver to follow one of the preset delivery procedures. Statuses of vehicle system devices may be monitored via a network bus within the delivery vehicle, such as a controller area network (CAN) bus.

The examples further include collecting delivery information to create a historical database of typical drop locations at various sites. Each site may have multiple different drop off locations. The delivery information may include sender identifiers (IDs), receiver (or recipient) IDs, driver IDs, ship from addresses, ship to addresses, coordinates of specific drop off locations, driving paths of delivery vehicles on premises to nearest parking location relative to drop off locations, walking paths of drivers moving packages from the parked locations to the drop off locations, delivery times of day, other unique delivery instructions, etc. In an embodiment, driver data is collected and an estimate of a most likely package drop off location for each shipping address is determined.

The most likely package drop off location may be determined using a global positioning system (GPS) receiver and/or by wirelessly communicating with a cloud-based server and/or a mobile device. The wireless communication may include transmission of radio frequency (RF) signals such as ultra-wideband (UWB) signals. The examples may include determining the location of the driver (or delivery person) relative to the drop off location based on information from the GPS receiver and/or by transmitting RF signals between vehicle antennas and the mobile device held by the delivery person. A location of the vehicle and a location of the mobile device relative to the vehicle may be determined followed by determining a location of the mobile device relative to the drop off location. This allows the system to select a path from multiple possible paths for delivering a package. A best historical path may be selected and/or a new path may be created and selected based on previous paths between a parked vehicle location and a drop off location. This allows historical path data to be used to provide improved clearer instructions for subsequent deliveries to drivers. The historical path data includes path data leading up to the last 10 feet of deliveries and path data associated with the last 10 feet of deliveries. This information may be provided to mobile devices and/or augmented reality devices of the drivers and/or the delivery vehicles to assist the drivers in completing the last 10 feet of deliveries and/or to follow a best possible delivery path.

Figure 2:
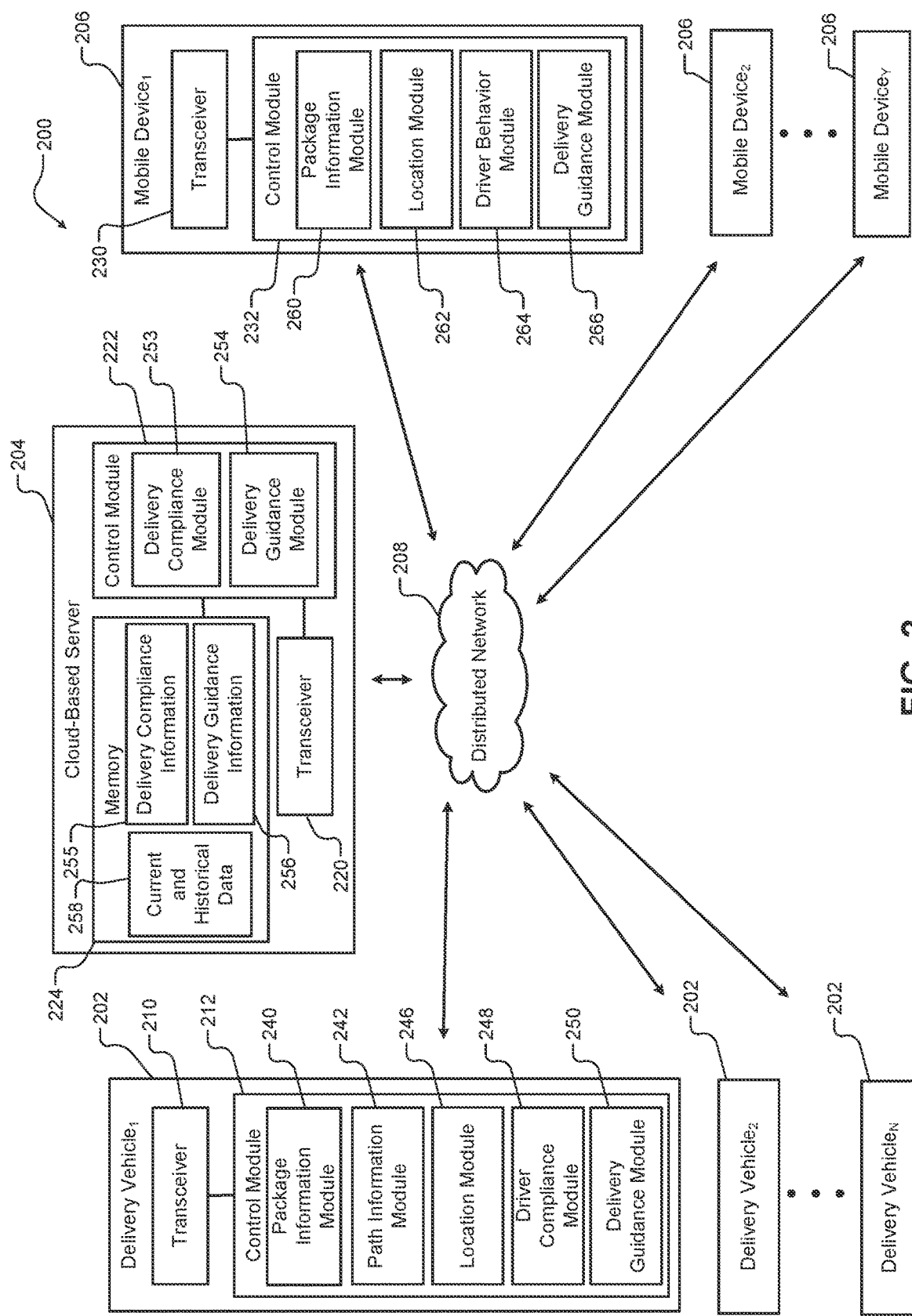
FIG. 2 is a functional block diagram of a delivery system including delivery vehicles, a cloud-based server and mobile devices performing driver compliance and delivery guidance operations in accordance with the present disclosure.

FIG. 2 shows a delivery system 200 including delivery vehicles 202, a cloud-based (or backend) server 204 and mobile devices 206 performing driver compliance and delivery guidance operations. The delivery vehicles 202, cloud-based server 204 and mobile devices 206 may be in communication with each other via a distributed network 208. As an example, the cloud-based server 204 may be implemented as a central office of a delivery service provider, which may include a fleet manager that monitors activity of delivery drivers of the delivery vehicles 202. The delivery vehicles 202 may include transceivers (one transceiver 210 is shown) and control modules (one control module 212 is shown). The control modules of the delivery vehicles 202 may be configured similarly. The cloud-based server 204 includes a transceiver 220, a control module 222, and a memory 224. The mobile devices 206 may include transceivers (one transceiver 230 is shown) and control modules (one control module 232 is shown). The control modules of the mobile devices 206 may be configured similarly.

The control modules of the delivery vehicles 202 monitor driver activities and report the driver activities to the cloud-based server 204. The control modules may provide performance compliance and delivery guidance information to the drivers independent of signals received from the cloud-based server 204 and/or based on signals received from the cloud-based server 204. Similarly, the mobile devices 206 may also provide delivery guidance information to the drivers independent of signals received from the cloud-based server 204 and/or based on signals received from the cloud-based server 204.

The control module 212 may include a package information module 240, a path information module 242, a location module 246, a driver compliance module 248 and a delivery guidance module 250. The package information module 240 may determine and/or track package data, such as a name of delivery service provider, a name of sending party (or sender), a name of receiving party (or receiver), addresses of sender and receiver, details regarding contents of the package, drop off instructions, etc. The path information module 242 may determine and/or track path information such as pickup locations, drop off locations, paths between the pickup and drop off locations, etc. The path information may include historical path information for same or similar delivery paths (or routes) by the same driver and/or different drivers. The path information may be drop off location specific.

The location module 246 may determine and/or track current locations of the delivery vehicle 202. The driver compliance module 248 determines compliance parameters, tracks activity of the driver, compares the compliance parameters to the tracked activity and determines whether the driver is in compliance (e.g., tracked parameters match or are within set ranges of corresponding compliance parameters) or out of compliance (e.g., one or more tracked parameters do not match or not within set ranges of one or more corresponding compliance parameters). The compliance parameters may include, relative to delivery times, for example: hazard light parameters indicating on and off times of hazard lights; seat belt parameters indicating when the driver seat belt is buckled and unbuckled; status of windows; status of doors; status of door locks; status of engine; status of whether a mobile device is docked; etc. Activity parameters may include similar parameters, but are indicative of driver behavior including indicating when the driver: turns on and off hazard lights, buckles the driver seat belt; closes the windows; closes the doors; locks the doors; etc. The driver compliance module 248 may perform live coaching and/or post coaching and/or provide messages indicating that one or more activity parameters are not in compliance and how to become in compliance. This may be done via, for example, an infotainment system as further described below. The delivery guidance module 250 provide guidance information to the driver to guide the driver to a destination and indicates where to drop off a package.

The driver compliance module 248 and the delivery guidance module 250 may exchange collected activity parameters and guidance information with the cloud-based server 204 and the mobile device 206 and vice versa. The control module 222 of the cloud-based server 204 may collect data from the delivery vehicle 202 and/or the mobile device 206, analyze the data and provide feedback to the control module 212 and/or the control module 232. The collected data may be activity data, location data, path data, etc.

The control module 222 may include a delivery compliance module 253 and a delivery guidance module 254, which may receive, track and/or provide delivery compliance information 255, delivery guidance information 256 and/or current and historical data 258 to and from the delivery vehicle 202 and the mobile device 206. The current and historical data 258 may include activity data, path data, etc. The delivery compliance information 255 may include the compliance parameters, suggested changes in behavior to get into compliance; and warning message indicating out of compliance and what activity is out of compliance. The delivery guidance information 256 may include path guidance and/or drop off instructions.

The mobile device 206 may also include a package information module 260, a location module 262, a driver behavior module 264 and a delivery guidance module 266. The package information module 260 may operate similarly as the path information module 242 but be directed to the last 10 feet of a route. The package information module 260 may determine and/or track path information such as pickup locations, drop off locations, paths between the pickup and drop off locations, etc. The location module 262 may determine and track locations of the mobile device 206. The driver behavior module 264 may track driver activities between the delivery vehicle and the drop off location while the driver is away from the delivery vehicle including: an amount of time to drop off package; a path followed from vehicle to the drop off location; an amount of time spent away from target path between delivery vehicle and drop off location; etc. The delivery guidance module 266 may provide driver assistance information for guiding a driver to a drop off location and indicate drop off instructions, such as where to specifically drop off package at a destination. This may include: direction information; indications of when to turn left, move straight ahead and turn right; how far to walk in current direction; etc.

Figure 3:
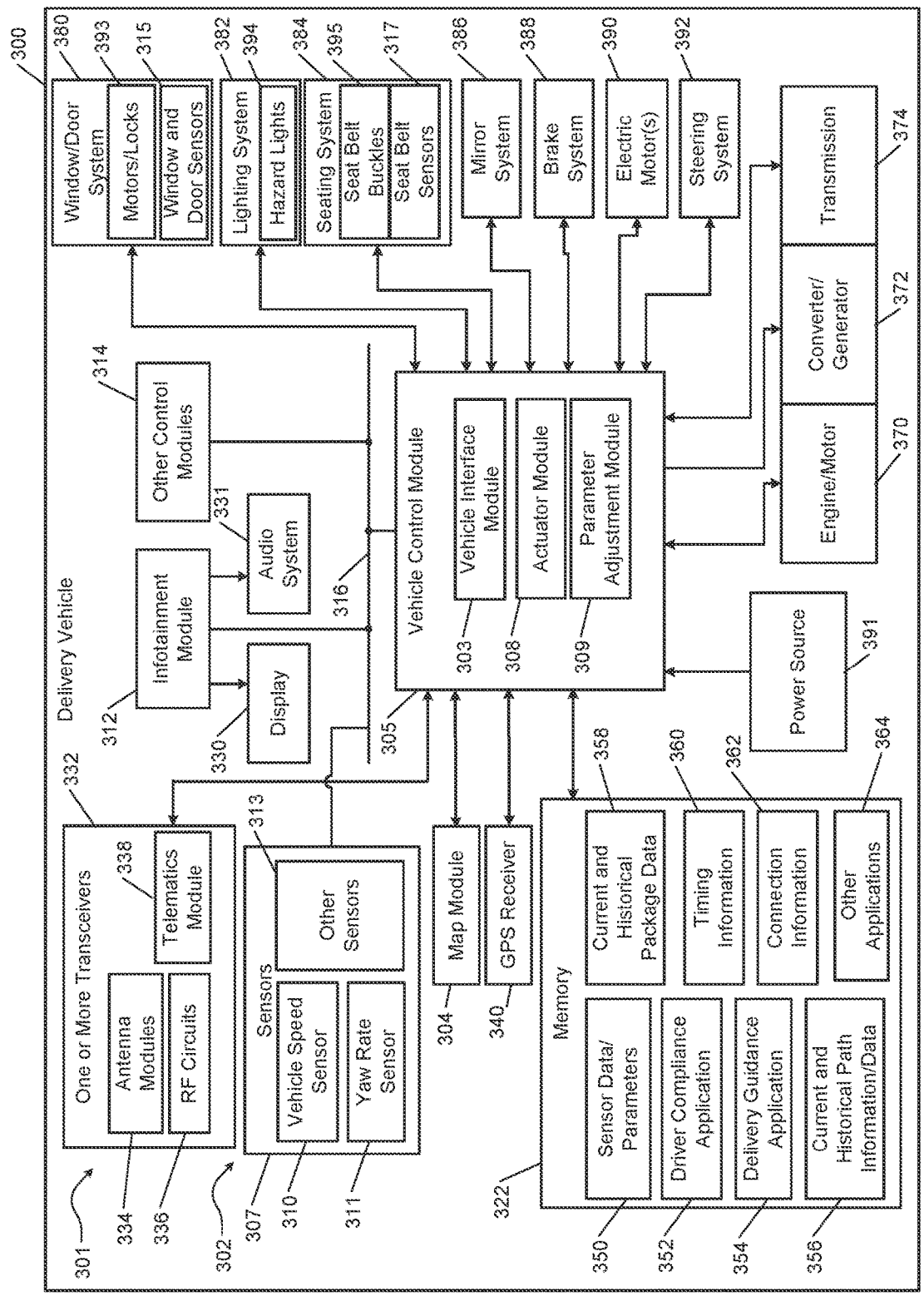
FIG. 3 is s functional block diagram of a delivery vehicle including a compliance and guidance system having a vehicle interface module in accordance with the present disclosure.

FIG. 3 is s functional block diagram of a delivery vehicle 300 including a compliance and guidance system 301 including a vehicle interface module 303. The vehicle 300 may replace one of the delivery vehicles 202 of the delivery system of FIG. 2. The vehicle 300 may be a fully or partially autonomous vehicle and includes a sensor system 302, a map module 304, and a vehicle control module 305, which may include the vehicle interface module 303, an actuator module 308 and a parameter adjustment module 309.

The sensor system 302 provides information about the vehicle 300. The sensor system 302 includes sensors 307, such as a vehicle speed sensor 310, a yaw rate sensor 311 and other sensors 313. The other sensors may include, for example, window and door sensors 315, seat belt sensors 317 and other sensors associated with activities of a driver. The window and door sensors 315 may indicate positions of windows and doors of the vehicle 300. The seat belt sensors 317 indicate whether the seat belts are buckled. The other sensors 313 may include a transmission sensor do determine whether the transmission is in, for example, a park (P), reverse (R), neutral (N), or drive (D) state. The data collected from the sensors 307 is provided to at least the modules 303 and 305. A map generated by, obtained by, and/or monitored by the map module 304 contains the geometric shapes and characteristics of surrounding areas in a format to allow the modules 303, 305, 308, 309 to determine where are available (permitted and feasible) driving areas and lanes.

When the vehicle 300 is an autonomous or partially autonomous vehicle, the actuator module 308 may be configured to control operation of the vehicle or a portion thereof to follow planned trajectories of the vehicle 300 between pickup and destination locations. When the vehicle 300 is a non-autonomous vehicle (or vehicle fully controlled by driver), the actuator module 308 or other module may provide indicators to the driver to follow planned trajectories. The planned trajectories may be determined by the vehicle control module 305.

The actuator module 308 may take the plan generated by the vehicle control module 305 and convert the plan to wheel, brake, and accelerator commands to affect the speed, acceleration, and heading of the delivery vehicle 300. The map and object (or obstacle) information may be used to determine a best trajectory for the delivery vehicle 300 to meet a goal condition (e.g., follow a particular path).

The vehicle 300 further includes an infotainment module 312 and other control modules 314 (e.g., a body control module). The modules 303, 305, 308, 309, 312 and/or 314 may communicate with each other via network interface 316, such as a controller area network (CAN) bus, a local interconnect network (LIN), a clock extension peripheral interface (CXPI) bus and/or other vehicle interfaces. In an embodiment, sensor signals are received from the sensor system 302 via a CAN bus at the vehicle control module 305.

The vehicle control module 305 may control operation of vehicles systems and may include the modules 303, 308, 309, as well as other modules. The vehicle control module 305 may also include one or more processors that are configured to execute instructions stored in a non-transitory computer-readable medium, such as the memory 322, which may include read-only memory (ROM) and/or random access memory (RAM).

The vehicle 300 may further include: a display 330; an audio system 331; and one or more transceivers 332 including antenna modules 334. The RF antenna modules 334 may include and/or be connected to RF circuits 336. The map module 304 may communicate with a telematics module 338, a global positioning system (GPS) receiver 340 and one or more of the sensors 307. The one or more transceivers 332 may include the telematics module 338. The vehicle control module 305 and/or the telematics module 338 are configured to receive GPS data and correlate GPS position data of the vehicle 300 to geographical map locations. Messages and telematics data ma be sent to the cloud-based server 204 via a cellular network, a 4G, 5G, long-term evolution (LTE) and/or other network.

The RF circuits 336 may be used to communicate with mobile devices, central offices, other vehicles, land-based stations, cloud-based networks, etc. including transmission of Bluetooth®, wireless fidelity (Wi-Fi) or Wi-Fi direct and/or other RF signals satisfying various wireless communication protocols. The RF circuits 336 may include radios, transmitters, receivers, etc. for transmitting and receiving RF signals. The telematics module 338 may be implemented by a global navigation satellite system (e.g., GPS), inertial navigation system, global system for mobile communication (GSM) system, and/or other location system. The telematics module 338 may provide map information including road and object information, such as: locations, speed, acceleration, heading of vehicles; locations of objects; distances between objections; distances between a current location an intermediary and/or target destinations; etc. This information may be provided to the map module 304.

The sensors 307 may include sensors used for path prediction and planning and actuator operations. The other sensors 313 may include cameras, objection detection sensors, temperature sensors, accelerometers, etc. The GPS receiver 340 may provide vehicle velocity and/or direction (or heading) of the vehicle 300 and/or global clock timing information.

The memory 322 may store various sensor data, parameter data, dimension states, trajectory planning information and other information. As an example, the memory 322 may store sensor and parameter data 350, a driver compliance application 352, a delivery guidance application 354, current and historical path information and/or data 356, current and historical package data 358, timing information 360, connection information 362, and other applications 364. The driver compliance application 352 is implemented to perform driver compliance operations as disclosed herein including: determining whether the drivers activities are in compliance; providing live coaching and/or post coaching to get the driver's activities in compliance; etc. The delivery guidance application 354 is implemented to perform driver guidance operations to guide and aid a driver is delivering packages. This may include providing step-by-step instructions to follow a delivery route and drop off a package.

The current and historical path information/data may include geographical coordinates, addresses, drop off locations, aspects describing the drop off locations, tasks to be performed at the drop off locations, tasks to be performed to locate the drop off locations, and/or other path information. The historical path information may include, for example, GPS coordinates, "3-word" based coordinates, and/or other coordinates. The current and historical package information may include names of sender and receiver, addresses of sender and receiver, whether contents of the package are fragile, handling instructions, specific drop off instructions, etc.

The timing information 360 may refer to times the vehicle 300 is at certain locations, time to predicted destination (or nodal) points, etc. Transitions may be time based, based on traveled distance, and/or other conditions. The connection information 362 may refer to information for connecting to other vehicles, mobile devices, cloud-based servers, back-end servers, remote stations, etc.

The applications 352, 354, 356, 358, 364 may be implemented by the modules 303, 305, 308, 309, 312, 314 and 338 and/or transceivers 332. The other applications 364 may include, for example, a planning application and an actuator application. The planning application may be executed by the vehicle control module 305 to plan a trajectory of the vehicle 300. The actuator application may be executed by the actuator module 308 to implement a trajectory plan selected by the vehicle control module 305. The vehicle control module 305 may determine a target path for the vehicle 300 to follow. The target path may be adjusted based on a changing environment. For example, the vehicle 300 may approach or encounter one or more objects, such as fixed objects, pedestrians, and/or other vehicles and update the target path. If the vehicle 300 is an autonomous vehicle, the vehicle 300 may follow the updated target path. The parameter adjustment module 309 may be used to adjust parameters of the vehicle 300.

Although the memory 322 and the vehicle control module 305 are shown as separate devices, the memory 322 and the vehicle control module 305 may be implemented as a single device.

The vehicle control module 305 may control operation of an engine or motor 370, a converter/generator 372, a transmission 374, a window/door system 380, a lighting system 382, a seating system 384, a mirror system 386, a brake system 388, electric motors 390 and/or a steering system 392 according to parameters set by the modules 303, 305, 308, 309, 334 and/or 338. The window/door system 380 may include window and/or door motors and door locks. The lighting system 393 may include hazard lights 394. The seating system 384 may include seat belt buckles 395 and corresponding seat belt sensors 317 for detecting when seat belts are buckled.

The vehicle control module 305 may receive power from a power source 391 that may be provided to the engine or motor 370, the converter/generator 372, the transmission 374, the window/door system 380, the lighting system 382, the seating system 384, the mirror system 386, the brake system 388, the electric motors 390 and/or the steering system 392, etc. Some of the operations as a result of planning may include enabling fuel and spark of the engine or motor 370, starting the electric motors 390, powering any of the systems referred to herein, and/or performing other operations as are further described herein. In one embodiment, the vehicle 300 does not include an engine and/or a transmission and the electric motors 390 are used for vehicle propulsion and/or driving purposes.

The engine or motor 370, the converter/generator 372, the transmission 374, the window/door system 380, the lighting system 382, the seating system 384, the mirror system 386, the brake system 388, the electric motors 390 and/or the steering system 392 may include actuators controlled by the vehicle control module 305 to, for example, adjust fuel, spark, air flow, steering wheel angle, throttle position, pedal position, door locks, window position, seat angles, etc. This control may be based on the outputs of the sensors 307, the map module 304, the GPS receiver 340 and the above-stated data and information stored in the memory 322.

A delivery service provider may require drivers to: activate hazard lights 394 at every delivery stop; turn the engine 370 of the delivery vehicle 300 off and remove keys from the delivery vehicle 300 when making a delivery; put the transmission 374 of the delivery vehicle 300 in park at every delivery stop; close windows and lock doors at every delivery stop; always engage seatbelt before starting the engine 370; wear a seatbelt at all times when driving; ensure all doors are closed before driving; and perform other tasks. The vehicle interface module 303 may monitor these activities by monitoring states of devices on the vehicle 300 including monitoring states of the hazard lights 394, states of the engine 370 (or motor) and transmission 374, states of windows, doors and door locks of the window and door system 380, states of seat belts of the seating system 384, etc. The activities may be monitored via the network interface 316, via direct connection to vehicle devices, and/or wirelessly. The vehicle control module 305 may send notifications and statistics of driver actions as part of telematics data to a fleet supervisor at the cloud-based server 204 of FIG. 2. This informs the fleet manager of driver activities and allows the fleet manager to coach the driver based on non-compliant activity detected. As an example, the telematics module 338 may be in communication with the transceivers 220, 230 of FIG. 2.

Figure 4:
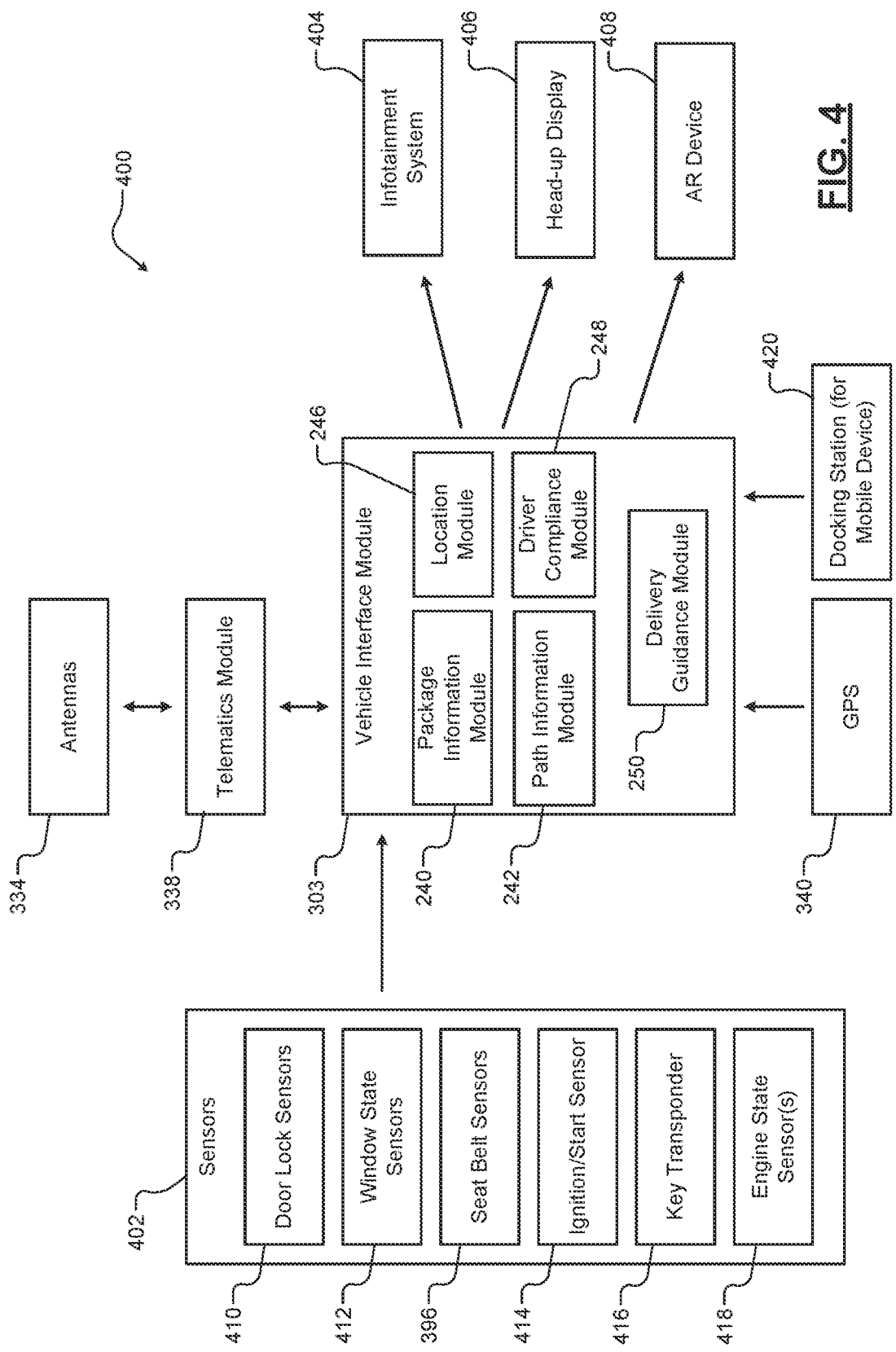
FIG. 4 is a functional block diagram of a portion of the compliance and guidance system of FIG. 3 in accordance with the present disclosure.

FIG. 4 shows a portion 400 of the compliance and guidance system 301 of FIG. 3. The portion 400 includes sensors 402, the vehicle interface module 303, the telematics module 338, the antennas 334, an infotainment system 404 including the infotainment module 312 of FIG. 3, a head-up display 406, an augmented reality (AR) device 408, and the GPS receiver 340. The sensors 402 may include door lock sensors 410, window state sensors 412, the seat belt sensors 317 of FIG. 3, an ignition/start sensor 414, a key transponder 416 and/or engine state sensors 418. The key transponder 416 may be used to detect presence of an ignition key and/or state of an ignition. The engine state sensors 418 may be used to detect whether an engine 370 of FIG. 3 is running and/or other parameters of the engine 370.

The vehicle interface module 303 may include the modules 240, 242, 246, 248 and 250 of FIG. 2. Referring to FIGS. 2 and 4, these modules may perform the operations described herein based on outputs from the sensors 402. This may include: sharing the collected information with the cloud-based server 204 via the telematics module 338; receiving guidance and/or instruction signals from the cloud-based server 204; displaying and/or audibly indicating information provided in the guidance and/or instruction signals to the driver via the infotainment system 404, head-up display 406, and/or AR device 408; and sending guidance and/or instruction signals to the mobile device 206 via the telematics module 338.

In an embodiment, the portion 400 includes a docking station 420 for a mobile device (e.g., the mobile device 206). The docking station 420 may detect when the mobile device is docked on the docking station and/or when the mobile device is in use. The instructions referred to below may indicate to the driver when to dock the mobile device and when not to use the mobile device.

Figure 5:
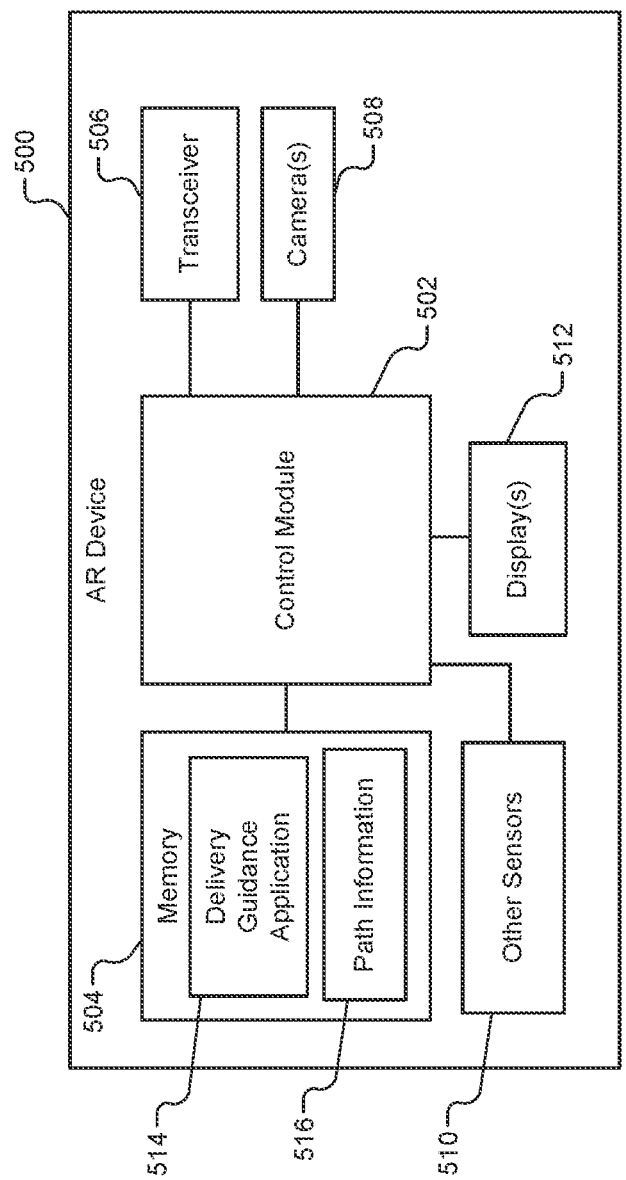
FIG. 5 is a functional block diagram of an example augmented reality (AR) device implementing delivery guidance and driver compliance operations in accordance with the present disclosure.

The AR device 408 may include an AR headset, AR glasses, and/or other AR imaging device. FIG. 5 shows an example AR device implementing delivery guidance. The AR device 408 of FIG. 4 may be implemented as the AR device 500. The AR device 500 may include a control module 502, a memory 504, a transceiver 506, one or more cameras 508, other sensors 510, and one or more displays 512. As an example, the memory 504 may store a delivery guidance application 514, path information 516 and other information and/or data. The delivery guidance application 514 may be executed by the control module 502 and provide delivery guidance information to the driver (or user of the AR device 500) via the displays 512. This may include providing path directions and drop off directions to the user via the displays 512. Directions may be provided for a last 10 feet of a delivery route. The cameras 508 may be used to capture images and/or video of route taken and images of final delivery location. These images and video may be shared with other AR devices, mobile devices, delivery vehicles and/or cloud-based server.

The control module 502 may record a path taken by the user via the cameras 508 and/or other sensors 510 and/or display path directions based on detected locations of the AR device 500. The other sensors 510 may include accelerometers, a gyroscope, a GPS receiver and/or other system and/or sensors for detecting motion, orientation and locations of the AR device 500. Accelerometer, gyroscope and GPS data may be used to provide turn-by-turn instructions.

Figure 6:
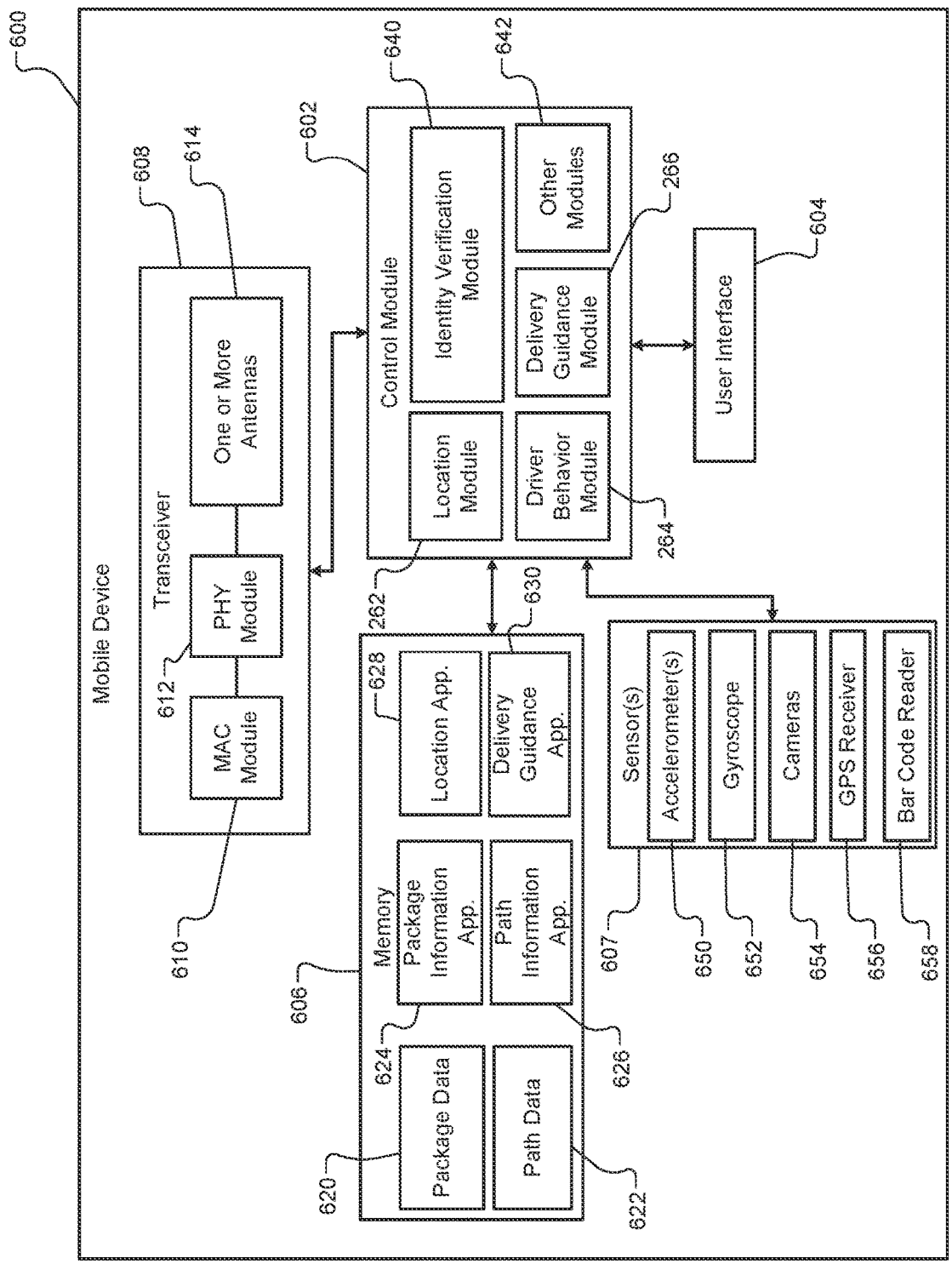
FIG. 6 is a functional block diagram of an example of a mobile device including modules in accordance with the present disclosure.

FIG. 6 shows an example mobile (or portable) device 600, which is an example of the mobile device 206 of FIG. 1. The mobile device 600 may be a mobile phone, a watch, a tablet, and/or other handheld or wearable device. The mobile device 600 may include a control module 602, a user interface 604, a memory 606, sensors 607 and a transceiver 608. The transceiver 608 may include a medium access control (MAC) module 610, a physical layer (PHY) module 612 and one or more antennas 614.

The control module 602 may include or be part of a Bluetooth® low energy (BLE) and/or UWB communication chipset. Alternatively, the control module 602 may include or be part of a Wi-Fi or Wi-Fi direct communication chipset. The memory 606 may store application code that is executable by the control module 602. For example, the memory 606 may store package data, 620, path data 622, a package information application 624, a path information application 626, a location application 628, and a delivery guidance application 630, which are executed by the control module 602. The memory 606 may be a non-transitory computer-readable medium including read-only memory (ROM) and/or random-access memory (RAM).

The control module 602 may include a location module 262 and communicate with the vehicle control module 305 of the vehicle 300 of FIG. 3 and determine a location of the mobile device 600. The location module 262 may perform UWB signal exchanges with the antenna modules 334 of the vehicle 300 of FIG. 3 to allow the location module 262 and/or the location module 246 of FIGS. 2 and 4 to determine a location of the mobile device 600. One of the modules 246, 262 may determine the location of the mobile device 600 relative to the vehicle and report the location to the other one of the modules 246, 262. Single sided ranging, double sided ranging, time-of-flight determining, round trip time determining, etc. may be performed to determine distances between mobile device 600 and reference points on the vehicle 300.

The control module 602 may further include an identity verification module 640, the driver behavior module 264, the delivery guidance module 266 and/or other modules 642. The driver behavior module 264 tracks behavior of the driver (or user of the mobile device 600). This includes: tracking behavior of the driver; tracking whether the driver is performing the tasks required by the delivery service provider for each delivery, such as the tasks mentioned above with respect to FIGS. 1-5; tracking tasks performed while driving; tracking tasks performed while transporting a package from a delivery vehicle to a drop off location; etc. The other modules 642 may include a service module that indicates service related information to the user, such as pickup and drop off times and locations, paths taken from pickup to drop off, pickup and delivery times and locations, charge rates for transferring and/or delivering packages, premium rates for certain locations, addresses and/or other pickup and drop off location identifiers, specific drop off instructions, etc. The service module may also indicate instructions based on driver behavior tracked and/or evaluated and/or transmitted to the mobile device 600 by the one of the modules 212, 222 of FIG. 2. For example, the mobile device 600 may report driver behavior to the delivery service provider (or the cloud-based server 204) and the delivery service provider may respond by sending instructions to the mobile device 600 for the user. The instructions may include instructions to maintain or alter current driver behavior, instructions to return the vehicle to the service company, and/or other instructions, some of which are disclosed below.

The control module 602 may transmit information regarding the mobile device 600, such as location, heading and/or velocity information obtained from one or more of the sensors 607 (e.g., a global navigation satellite system (e.g., GPS receiver) sensor, an accelerometer, a gyroscope, and/or an angular rate sensor). In the example shown, the sensors 607 include one or more accelerometers 650, a gyroscope 652, cameras 654, GPS receiver 656 and/or bar code reader 658. In another embodiment, the gyroscope 652 is not utilized. The user interface 604 may include a keypad, a touch screen, a voice activated interface, and/or other user interface. As an example, the user interface 604 may be used to allow a driver to respond to received instructions indicating that the driver has received, acknowledged, and/or agrees to follow the provided instructions. The instructions may have been received from the one of the modules 212, 222 of FIG. 2.

Figure 7:
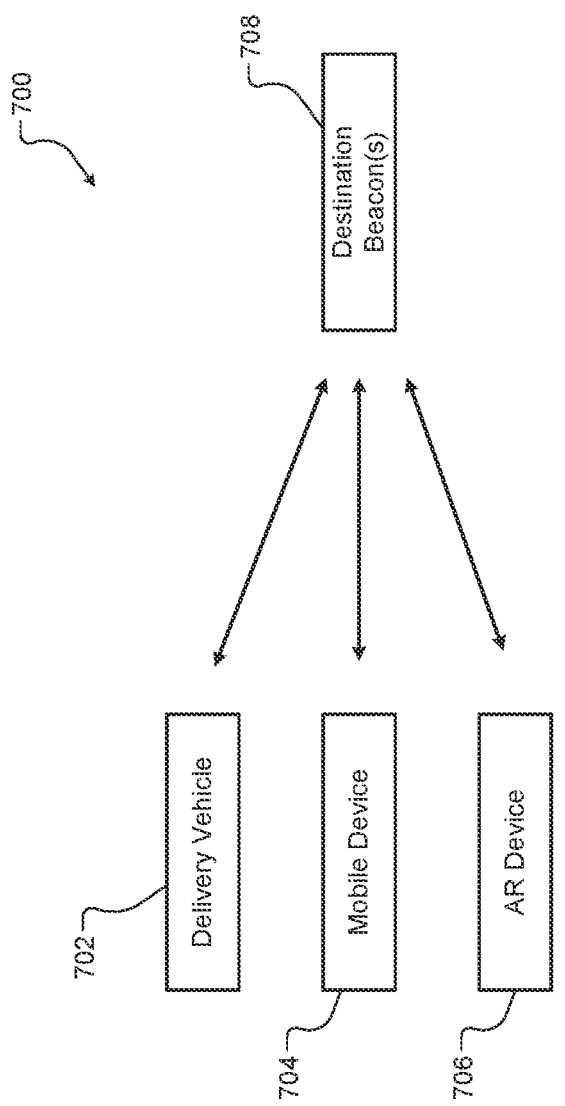
FIG. 7 is a functional block diagram of an example delivery system including destination beacons in accordance with another embodiment of the present disclosure.

FIG. 7 shows a delivery system 700 that includes a delivery vehicle 702, a mobile device 704, an AR device 706 and one or more destination beacons 708. The delivery vehicle 702, mobile device 704 and AR device 706 may be configured similarly as other vehicles, mobile devices and AR devices referred to herein. The destination beacons 708 may be located at a drop off location and generate beacon signals (e.g., UWB signals having a particular signature) for the recipient of the package being delivered. The destination beacons 708 may be triggered on when the driver is within a set distance of the destination beacons 708. The control module of the delivery vehicle 702, mobile device 704 and/or AR device 706 may be in communication with the destination beacons. The destination beacons 708 may determine a distance between the delivery vehicle 702, mobile device 704 and AR device 706 and based on the distance trigger generation of the beacon signals. The distance may be determined by the delivery vehicle 702, mobile device 704 and/or AR device 706 based on signal strength of signals transmitted by the destination beacons 708 and shared with the destination beacons 708. The distance may alternatively be determined by the destination beacons 708 based on signal strength of signals transmitted by the control module of the delivery vehicle 702, mobile device 704 and/or AR device 706.

The beacon signals are detected by sensors, telematics modules, etc. of the delivery vehicle 702, mobile device 704 and AR device 706 and used to determine the location of the drop off location relative to the delivery vehicle 702, mobile device 704 and/or AR device 706. This allows the delivery vehicle 702, mobile device 704 and AR device 706 to determine distances to the drop off location and directions (or step-by-step instructions) to provide a driver to deliver a package. Multiple destination beacons (also referred to as anchors) may be located at the drop off location and/or on the premises of the drop off location to allow the delivery vehicle 702, mobile device 704 and AR device 706 to triangulate the location of the drop off location. In an embodiment, the destination beacons 708, mobile device 704 and/or AR device 706 generate audible signals that can be heard by the driver. The closer the driver gets, the higher the frequency and/or loudness of the audible signals (e.g., the higher the frequency and/or loudness of beeps generated).

Figure 8:
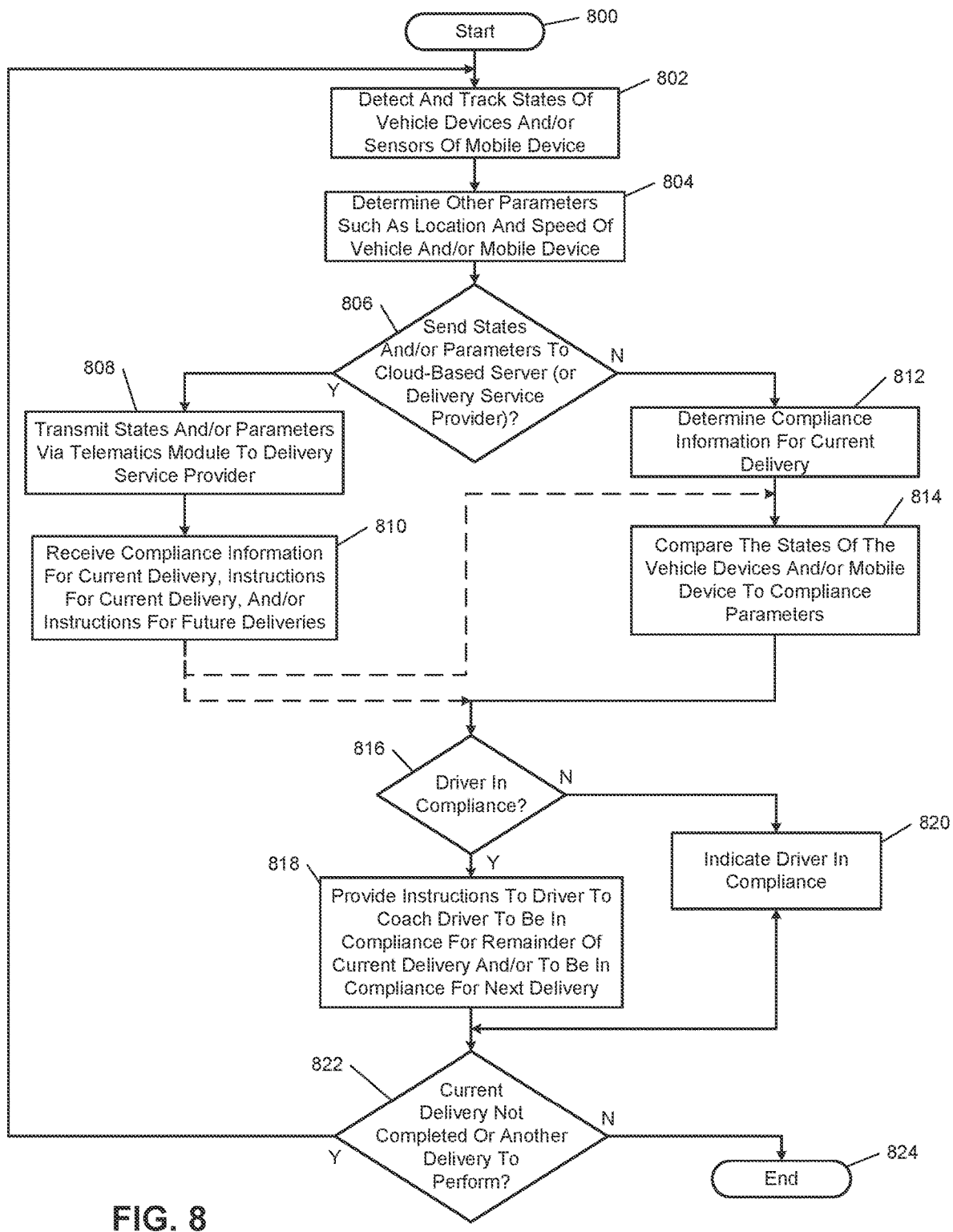
FIG. 8 illustrates a driver compliance method in accordance with the present disclosure.
Figure 9:
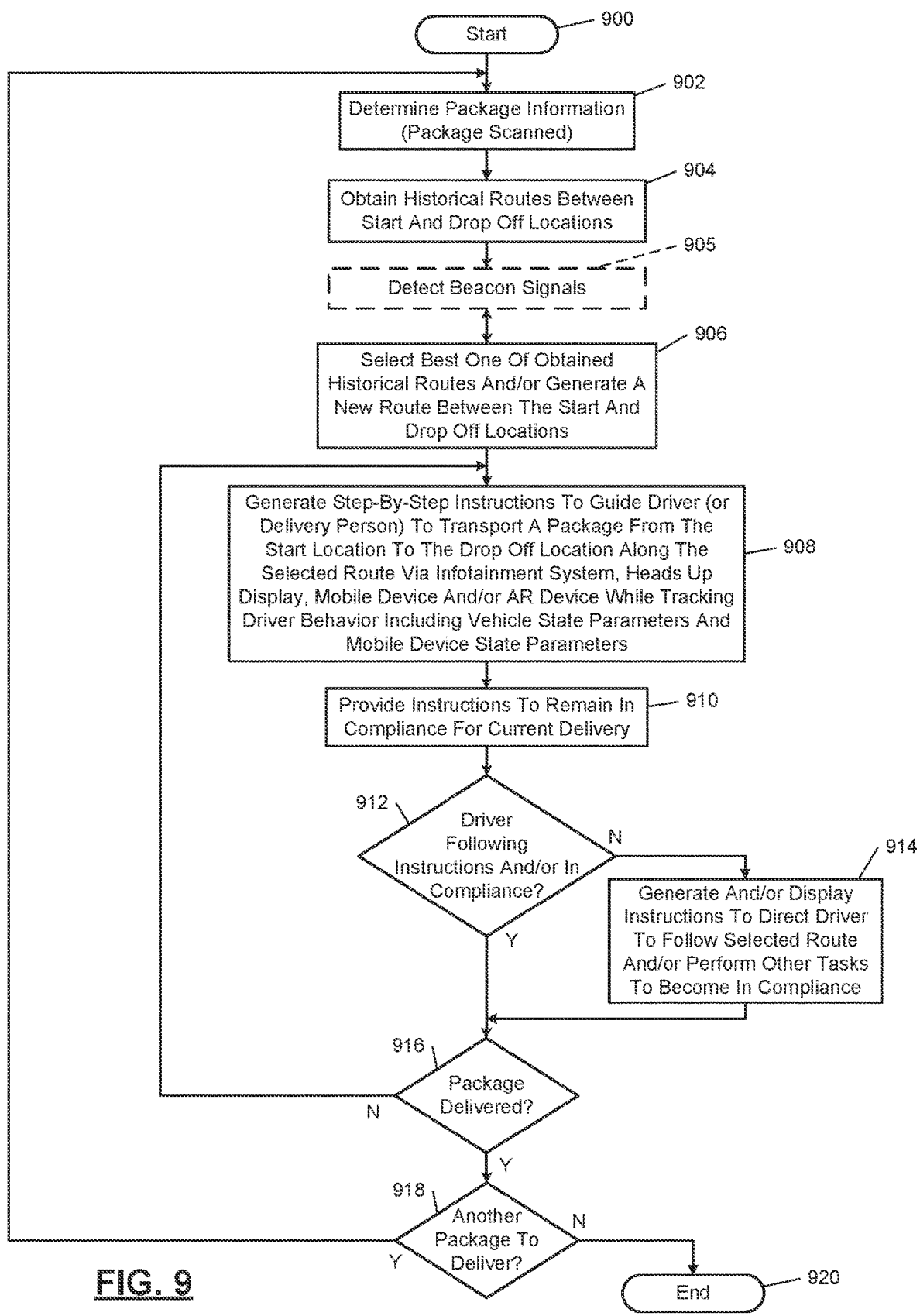
FIG. 9 illustrates a delivery guidance method in accordance with the present disclosure.

Although the following methods of FIGS. 8-9 are shown as separate methods, the methods and/or operations from the methods may be combined and performed as a single method. Although the operations of these methods are primarily described with respect to the implementations of FIGS. 1-7, the operations may be easily modified to apply to other implementations of the present disclosure. The operations of FIGS. 8-9 may be iteratively performed. In the following paragraphs the phrase "the control module of the delivery vehicle, the mobile device and/or the AR device" means "the control module of the delivery vehicle, the control module of the mobile device, and/or the control module of the AR device". The operations performed by the control module of the vehicle may be performed by the modules 240, 242, 246, 248 and 250. The operations performed by the control module of the mobile device may be performed by the modules 262, 264, 266, 642.

FIG. 8 illustrates a driver compliance method. The method of FIG. 8 may begin at 800. At 802, the states of delivery vehicle devices and/or sensors of a mobile device are detected and/or tracked. This may occur at the delivery vehicle and/or at the mobile device. The states of the devices may refer to states of sensors of the delivery vehicle.

At 804, parameters of the delivery vehicle and/or mobile device may be determined. The parameters may be based on outputs of the sensors of the delivery vehicle and mobile device. For example, the speed and location of the delivery vehicle and/or mobile device may be determined.

At 806, a determination may be made as to whether the detected and/or determined states and/or parameters are to be transmitted to a cloud-based server (or delivery service provider). If yes, operation 808 may be performed, otherwise operation 812 may be performed.

At 808, the delivery vehicle and/or mobile device transmits the states and/or parameters via a telematics module and/or transmitter to the cloud-based server. The cloud-based server may evaluate the provided states and/or parameters for the current delivery by comparing the states and/or parameters to compliance parameters. The cloud-based server (or control module thereof) may then provide compliance feedback information to the delivery vehicle and/or mobile device.

At 810, the delivery vehicle and/or mobile device may receive the compliance information, which may be for a current delivery and/or instructions for future deliveries. The information may include instructions to alter driver behavior such that future driver behavior is in compliance. Operation 812 or 816 may be performed subsequent to operation 810.

At 812, the control module of the delivery vehicle and/or the control module of the mobile device may determine compliance information for the current delivery. The compliance information may be stored in the memories of the delivery vehicle and/or mobile device and/or provided by the cloud-based server to the delivery vehicle and/or mobile device.

At 814, the control module of the delivery vehicle and/or the control module of the mobile device may compare the states and/or parameters to compliance parameters included in the compliance information. Operations 810, 814 and 816 are performed to i) monitor and track order of events, states of delivery vehicle devices, and patterns of the states of the delivery vehicle devices over time, ii) compare this information to compliance information that includes order of events in compliance, compliance states of delivery vehicle devices, compliance ranges, and compliance patterns of the states of the delivery vehicle devices, and iii) based on these comparisons, determine whether the driver actions are in compliance.

At 816, if the states and/or parameters match or are within set compliance ranges of the compliance parameters, then operation 818 may be performed, otherwise operation 820 may be performed.

At 818, the control module of the delivery vehicle and/or mobile device may provide instructions to the driver to coach the driver to be in compliance for a remainder of a current delivery and/or to be in compliance for subsequent deliveries. The instructions may have been provided in the compliance information from the cloud-based server or may have been stored in the memories of the delivery vehicle and/or mobile device. This may be done via an infotainment system of the delivery vehicle, a display of the mobile device, an AR device, etc.

At 820, the control module of the delivery vehicle and/or mobile device may indicate that the driver is in compliance. This may be done via the infotainment system, the display of the mobile device, the AR device, etc.

At 822, if the current delivery is not completed or another delivery is to be performed, operation 802 may be performed, otherwise the method may end at 824.

FIG. 9 illustrates a delivery guidance method. The method may begin at 900. At 902, a control module of a delivery vehicle, a mobile device and/or an AR device may determine package information. A package may be picked up and a shipping label of the package may be scanned and delivery information for the package may be loaded based on a bar code, a quick response (QR) code, image data, etc. The package information may include sender and receiver identifiers, pickup and drop off locations, phone numbers of sender and receiver, passcodes to enter receiver premises, instructions to enter receiver premises, instructions to follow when on receiver premises, addresses of sender and receiver, delivery instructions specific to the package, etc. This may include scanning a shipping label on the package to obtain shipping information, which is used to help guide the driver to the correct delivery location. The package may be scanned by the mobile device and/or data regarding the package may be downloaded to the delivery vehicle, the AR device, and/or the mobile device. The guidance may be based on location of the delivery vehicle, mobile device and/or AR device via, for example, a GPS receiver of the delivery vehicle, mobile device and/or AR device. The mobile device may transmit package information to the delivery vehicle and/or AR device. The data regarding the package may be uploaded to the cloud-based server, which may then download package information to the delivery vehicle, mobile device and/or AR device.

A starting point of a delivery route may not be at a package pickup location but may rather be at a driver current location and/or at a drop off location of a last delivery. Multiple packages for multiple deliveries may be picked up and then each package may be delivered. Thus, a best route selected for delivering a package may be i) from the driver current location and/or a last drop off location instead of a pickup location, and ii) to a next delivery drop off location. The driver current location may be any location of the driver when on the premises of the last recipient of a last delivered package.

At 904, the control module of the delivery vehicle, mobile device and/or AR device obtains historical routes between start and drop off locations. The start locations may be pickup locations, last drop off locations, locations on premises of last deliveries, etc. The historical routes may be routes previously taken by the delivery vehicle or routes taken by other delivery vehicles. The historical routes may be stored in the memories of the delivery vehicle, the mobile device and/or the AR device. The historical routes may be stored in the cloud-based server and provided to the delivery vehicle, the mobile device and/or the AR device.

At 905, beacon signals may be detected at the delivery vehicle, mobile device and/or AR device. The beacon signals may be transmitted from destination beacons indicating a drop off location. In one embodiment, the beacon signals are detected once arriving at the premises of the receiver of the package.

At 906, the control module of the delivery vehicle, mobile device and/or AR device selects a best route and/or a remainder route. A remainder route refers to a partial route from a current location to the drop off location. The current location may be a pickup location or a location between the pickup location and the drop off location. The best route is selected based on: historical routes taken between the current location and the drop off location; determined locations of beacons relative to the delivery vehicle, the mobile device and/or the AR device; locations of the mobile device and/or AR device relative to the delivery vehicle, etc. This information may be weighted based on: age of the information; efficiency of the possible routes in distance, mileage and time involved to follow the possible routes; whether the route is safe; and/or other information. The older the age of the information the lower the weight given. The less efficient the possible route the lower the weight given. The longer the distance of the route the lower the weight given. As an example, the information may be normalized, weighted, summed, and averaged for each possible route and the resultant values are compared. The possible route with the highest resultant value may be selected.

At 908, the control module of the delivery vehicle, the mobile device and/or the AR device generates step-by-step instructions to guide the driver to transport the current package being delivered from the start location to the drop off location along the selected route. The step-by-step instructions may be provided via the infotainment system of the delivery vehicle, heads up display of the delivery vehicle, the display of the mobile device, the displays of the AR device, and/or other audible and/or video device. These operations may be done while concurrently tracking behavior of the driver including delivery vehicle state parameters and mobile device state parameters. Some example instructions are: "Turn Right Here", "Turn Left and enter door code 1234", "leave package at unit #16", and "Please take picture to confirm delivery". Other instructions may be generated.

The AR device and/or head up display (HUD) may display instructions such as "Please park here (shows map)", "The drop location is on the right about 120 feet from here", etc. Map images and/or images of the area may be provided to illustrate where to go and/or leave package. The HUD may display inside the delivery vehicle information regarding where to park, distance to drop off location, which side of a street the drop off location is located, etc. This may be based on a location of the delivery vehicle and past knowledge. Applications running on the delivery vehicle, mobile device and/or AR device may use GPS receiver to determine the location of the driver and then, based on input from the driver, transmit UWB or other RF signals to share route information and/or customer unique information regarding unique drop of instructions with other drivers. The AR device may also display map images and/or images of the area indicating where to go and/or leave a package. The HUD and AR device may provide turn-by-turn instructions to complete a delivery. The AR device may include a camera, which is as a result on the driver (or delivery person), and may serve as a package scanning device. The camera may take a picture of the package and surrounding area at the drop off location as proof of delivery. This may be performed as a passive and hands-free proof of delivery. The control module of the AR device may automatically take the picture upon determining that the package is at the drop off location.

At 910, the control module of the delivery vehicle, the mobile device and/or the AR device provides instructions to become in compliance or remain in compliance for the current delivery.

At 912, the control module of the delivery vehicle, the mobile device and/or the AR device may determine whether the driver is following the instructions and/or is in compliance. If yes, operation 916 is performed, otherwise operation 914 is performed.

At 914, the control module of the delivery vehicle, the mobile device and/or the AR device generates and/or displays instructions to direct the driver to follow the selected route and/or perform other tasks to become in compliance.

Operations 908, 910 and 914 are performed to get the driver in compliance and/or to keep the driver in compliance. Operation 912 may be performed to determine errors in driver behavior and operation 914 may be performed to provide instructions to correct the errors and/or prevent the errors in the future.

At 916, the control module of the delivery vehicle, the mobile device and/or the AR device may determine whether the package has been delivered. If yes, operation 918 may be performed, otherwise operation 908 may be performed.

At 918, the control module of the delivery vehicle, the mobile device and/or the AR device may determine whether another package is to be delivered. If yes, operation 902 may be performed, otherwise the method may end at 920.

The above-described operations of FIGS. 8-9 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Operations of the above-described methods and/or other operations disclosed herein may be performed at a delivery vehicle, a mobile device and/or an AR device. Although some operations may be described for one or more of the delivery vehicle, a mobile device or an AR device, the operations may be performed at any of the delivery vehicle, mobile device and AR device. Information collected and/or determined at any of the delivery vehicle, mobile device and AR device may be shared with the other ones of the delivery vehicle, mobile device and AR device. The information may also be shared with a cloud-based server and/or other delivery vehicles, mobile devices and/or AR devices.

The above-described systems and methods instruct delivery drivers how to complete an ideal delivery through audio and visual devices. The tracking of the driver (or delivery person) behaviors enables passive proof of delivery. Control modules of delivery vehicles, mobile devices, AR devices and/or a cloud-based server may determine whether a delivery has been made based on the tracked behavior. The control modules may automatically contact a sender and/or a receiver (or customer) when a driver is unable to gain access to, for example, an apartment or office complex to locate a delivery location. The customer may then provide access and allow the driver to complete the delivery.

The above-described systems and methods allow drivers to share route knowledge to improve efficiency in delivering packages as performed by drivers and delivery vehicles of a delivery service provider.

Example embodiments are provided so that this disclosure will be thorough, and will fully convey the scope to those who are skilled in the art.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element is referred to as being "on," "engaged to," "connected to," or "coupled to" another element, it may be directly on, engaged, connected or coupled to the other element, or intervening elements may be present. In contrast, when an element is referred to as being "directly on," "directly engaged to," "directly connected to," or "directly coupled to" another element, there may be no intervening elements present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, devices, areas, and/or sections, these elements, components, devices, areas, and/or sections should not be limited by these terms. These terms may be only used to distinguish one element, component, device, area or section from another element, component, device, area or section. Terms such as "first," "second," and other numerical terms when used herein do not imply a sequence or order unless clearly indicated by the context. Thus, a first element, component, device, area or section discussed below could be termed a second element, component, device, area or section without departing from the teachings of the example embodiments.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A delivery compliance system comprising:
a memory configured to store a driver compliance application; and
a control module implemented in at least one of a delivery vehicle, a mobile device, and an augmented reality (AR) device, and configured to receive package information in response to a first package being scanned, wherein the control module is configured, in response to receiving the package information, to execute the driver compliance application to
detect states of a plurality of vehicle devices of the delivery vehicle, wherein the plurality of vehicle devices comprise two or more of a hazard light, an engine, a door lock, a window motor, an ignition key, and a seat belt buckle,
detect location and speed information indicative of a location and speed of at least one of the delivery vehicle, the mobile device, and the AR device,
determine a delivery route for delivery of the first package from a start location to a drop off location,
based on the location and speed information and the delivery route, determine compliance correct states for the plurality of vehicle devices,
compare the states of the plurality of vehicle devices to the compliance correct states for the plurality of vehicle devices to determine whether the detected states match or are within set ranges of the compliance correct states,
based on the comparison, generate instructions, via at least one of a display and an audio system of the at least one of the delivery vehicle, the mobile device, and the AR device, to instruct a driver of the delivery vehicle to at least one of i) become in compliance for the delivery of the first package, and ii) be in compliance when making a subsequent delivery of a second package,
based on the comparison, control operation of at least one of the delivery vehicle, the mobile device, and the AR device, and
based on the control, instruct the driver, via the at least one of the display and the audio system, to change state of at least one of the plurality of vehicle devices to become in compliance for the delivery of the first package.

2. The delivery compliance system of claim 1, wherein the control module is configured to determine whether a pattern of states of the plurality of vehicle devices at least one of matches and is in compliance with a compliance pattern, and generate the instructions based on differences between the pattern of states and the compliance pattern.

3. The delivery compliance system of claim 1, wherein the control module is configured to determine whether a pattern of states of the plurality of vehicle devices over time and along the determined delivery route at least one of match and are in compliance with a compliance pattern, and generate the instructions based on differences between the pattern of states and the compliance pattern.

4. The delivery compliance system of claim 1, wherein the control module is configured to provide live coaching for the driver to become in compliance for the delivery of the first package.

5. The delivery compliance system of claim 1, wherein the control module is configured to provide instructions for the driver to be in compliance for delivery of a second package delivered subsequent to delivery of the first package.

6. The delivery compliance system of claim 1, wherein the control module is configured to provide the instructions via an infotainment system of the delivery vehicle.

7. The delivery compliance system of claim 1, wherein the control module is configured to provide instructions via a display of the mobile device.

8. The delivery compliance system of claim 1, wherein the control module is configured to provide instructions via a display of the AR device.

9. The delivery compliance system of claim 1, wherein the control module is implemented in the delivery vehicle.

10. The delivery compliance system of claim 1, wherein the control module is implemented in the mobile device.

11. The delivery compliance system of claim 1, wherein the control module is implemented in the AR device.

12. The delivery compliance system of claim 1, further comprising a transceiver configured to transmit the states of the plurality of vehicle devices to a cloud-based server, and receive at least some of the instructions from the cloud-based server.

13. The delivery compliance system of claim 1, wherein the control module is configured to determine the delivery route based on at least one of historical routes of the delivery vehicle and historical routes of other delivery vehicles.

14. A delivery guidance system comprising:
a memory configured to store a delivery guidance application and a plurality of historical delivery routes;
a transceiver configured to receive a beacon signal from a beacon located at a drop off location; and
a control module implemented in at least one of a delivery vehicle, a mobile device, and an augmented reality (AR) device, and configured to
receive package information in response to a package to be delivered being scanned,
in response to receiving the package information, determine a start location and the drop off location and execute a driver compliance application,
obtain ones of the plurality of historical delivery routes beginning at the start location and ending at least one of the drop off location and a premises of the drop off location,
selecting a delivery route based on the ones of the plurality of historical delivery routes,
generating step-by-step instructions for a delivery person, via at least one of a display and an audio system of the delivery vehicle, the mobile device, and the AR device, to guide the delivery person along the selected delivery route to transport the package from the start location to the drop off location including a last 10 feet of the selected delivery route, wherein the step-by-step instructions include step-by-step instructions for the last 10 feet of the selected delivery route of the package, and
based on the beacon signal, generate the step-by-step instructions at least in the last 10 feet of the selected delivery route of the package,
wherein the control module is further configured to execute the driver compliance application to
detect states of a plurality of vehicle devices of the delivery vehicle, wherein the plurality of vehicle devices comprise two or more of a hazard light, an engine, a door lock, a window motor, an ignition key, and a seat belt buckle,
detect location and speed information indicative of a location and speed of at least one of the delivery vehicle, the mobile device, and the AR device, determine a delivery route for delivery of the package from a start location to a drop off location, based on the location and speed information and the delivery route, determine compliance correct states for the plurality of vehicle devices, compare the detected states of the plurality of vehicle devices to the compliance correct states for the plurality of vehicle devices to determine whether the detected states match or within set ranges of the compliance correct states, based on the comparison, generate instructions, via at least one of the display and the audio system of the at least one of the delivery vehicle, the mobile device, and the AR device, to instruct a driver of the delivery vehicle to at least one of i) become in compliance for the delivery of the package, and ii) be in compliance when making a subsequent delivery of a second package, based on the comparison, control operation of at least one of the delivery vehicle, the mobile device, and the AR device, and based on the control, instruct the driver, via the at least one of the display and the audio system, to change state of at least one of the plurality of vehicle devices to become in compliance for the delivery of the package.

15. The delivery guidance system of claim 14, wherein the control module is configured to track behavior of the delivery person based on at least one of states of a plurality of devices of the delivery vehicle, states of the mobile device, and states of the AR device, to compare the tracked behavior to compliance information, and based on this comparison, generate the step-by-step instructions.

16. The delivery guidance system of claim 14, wherein the control module is implemented in the delivery vehicle.

17. The delivery guidance system of claim 14, wherein the control module is implemented in the mobile device.

18. The delivery guidance system of claim 14, wherein the control module is implemented in the AR device.

19. The delivery monitoring system of claim 1, further comprising a plurality of sensors configured to detect the location and speed information.

20. The delivery monitoring system of claim 1, wherein the control module is configured to, based on the comparison, provide the instructions to the driver via i) an infotainment system of the delivery vehicle, ii) the mobile device, or iii) a display of the AR device.

21. The delivery monitoring system of claim 14, wherein:
the selected delivery route includes a destination; and
the step-by-step instructions for the last 10 feet of the selected delivery route include turn right and left instructions, a specific location at the destination where to leave package, and a take a picture instruction to confirm delivery.

22. The delivery monitoring system of claim 14, wherein:
the selected delivery route includes a destination; and
the step-by-step instructions for the last 10 feet of the selected delivery route indicate at least one of a parking lot, a building, a floor, a hallway, a room, a mailroom, a doorstop, a door code, and a doorway.

23. The delivery compliance system of claim 1, wherein the mobile device is configured to scan the first package to obtain the package information.

24. The delivery compliance system of claim 1, wherein:
the speed is of the mobile device or the AR device; and
the mobile device is implemented as a mobile phone, a wearable device, or a tablet.

25. The delivery monitoring system of claim 14, further comprising the beacon.

* * * * *